(12) United States Patent
MacCready et al.

(10) Patent No.: US 11,623,556 B2
(45) Date of Patent: Apr. 11, 2023

(54) RETRACTABLE COVER FOR A BOAT TRAILER

(71) Applicants: Jackson Canvas Company, Jackson, MI (US); Creek Meadow Marine LLC, Fenton, MI (US)

(72) Inventors: Ted MacCready, Jackson, MI (US); Stephen Brown, Fenton, MI (US)

(73) Assignees: Jackson Canvas Company, Jackson, MI (US); Creek Meadow Marine LLC, Fenton, MI (US)

( * ) Notice: Subject to any disclaimer, the term of this patent is extended or adjusted under 35 U.S.C. 154(b) by 0 days.

(21) Appl. No.: 17/015,478

(22) Filed: Sep. 9, 2020

(65) Prior Publication Data

US 2022/0072989 A1 Mar. 10, 2022

(51) Int. Cl.
| | |
|---|---|
| *B60P 3/10* | (2006.01) |
| *B60J 7/02* | (2006.01) |
| *B60P 7/02* | (2006.01) |
| *B60J 7/10* | (2006.01) |
| *B62D 65/02* | (2006.01) |

(52) U.S. Cl.
CPC .......... *B60P 3/1041* (2013.01); *B62D 65/024* (2013.01); *B60J 7/02* (2013.01); *B60J 7/102* (2013.01); *B60P 7/02* (2013.01)

(58) Field of Classification Search
CPC ........ B60P 3/10; B60P 3/1033; B60P 3/1041; B60P 3/1075; B60P 3/1066; B60P 3/1091; B60P 7/02; B60P 7/04; B60J 7/064; B60J 7/102

See application file for complete search history.

(56) References Cited

U.S. PATENT DOCUMENTS

| | | | |
|---|---|---|---|
| 3,488,084 A | 1/1970 | Ekstrom | |
| 3,604,747 A | 9/1971 | German | |
| 5,481,999 A | 1/1996 | Clark | |
| 5,549,438 A | 8/1996 | Dwyer et al. | |
| 6,651,997 B2 | 11/2003 | Higginson | |
| 6,976,433 B1* | 12/2005 | Neumann | B60J 7/065 |
| | | | 296/100.12 |
| 7,281,728 B1 | 10/2007 | Wayrynen | |
| 7,413,209 B2 | 8/2008 | MacKarvich | |
| 7,555,994 B1* | 7/2009 | Arnall | B63B 17/02 |
| | | | 114/361 |
| 7,584,981 B2 | 9/2009 | Vonderahe et al. | |

(Continued)

*Primary Examiner* — Gregory A Blankenship
(74) *Attorney, Agent, or Firm* — Warner Norcross + Judd LLP (57) ABSTRACT

A retractable trailer cover adapted for mounting to an existing boat trailer and a method for retrofitting the trailer cover to the boat trailer. The trailer cover includes multiple ribs extending from one side to the other, a flexible cover material, two elongated tracks, and multiple wheels received within the tracks. The ribs are affixed to the wheels so as to be slidably mounted to the tracks. Mounting brackets can be spaced along each of the trailer cover sides, and the tracks can be affixed to the mounting brackets. To mount the trailer cover to the boat trailer, the mounting brackets can be attached to a frame of the boat trailer. The trailer cover can selectively be expanded and retracted to cover and uncover an associated boat and boat trailer and may be used with new or used trailers.

6 Claims, 9 Drawing Sheets

(56) References Cited

U.S. PATENT DOCUMENTS

| | | | |
|---|---|---|---|
| 7,828,316 B1 * | 11/2010 | Joseph | B60P 3/1058 |
| | | | 280/414.1 |
| 7,931,326 B2 * | 4/2011 | Beshiri | B60J 7/102 |
| | | | 296/100.18 |
| 8,123,274 B1 | 2/2012 | Edwards et al. | |
| 8,246,066 B1 | 8/2012 | Allen et al. | |
| 8,322,750 B2 | 12/2012 | Crow et al. | |
| 8,359,994 B1 | 1/2013 | Highfield | |
| 9,027,499 B1 | 5/2015 | Clarke | |
| 9,212,502 B1 | 12/2015 | Siewert | |
| 9,346,388 B2 | 5/2016 | Aamodt et al. | |
| 9,446,824 B2 | 9/2016 | Swart | |
| 9,987,964 B1 | 6/2018 | Napier | |
| 10,245,996 B1 | 4/2019 | Wanke | |
| 10,479,259 B1 | 11/2019 | Gabhart | |
| 10,899,205 B1 * | 1/2021 | Knight | B60J 7/102 |
| 2017/0305503 A1 | 10/2017 | Murphy | |
| 2022/0072989 A1 * | 3/2022 | MacCready | B62D 65/024 |
| 2022/0185082 A1 * | 6/2022 | Petelka | B62D 33/04 |

* cited by examiner

RETRACTABLE COVER FOR A BOAT TRAILER

BACKGROUND

The present invention relates to a retractable cover for a boat trailer, and more particularly to a retractable trailer cover that can be retrofitted for use on an existing boat trailer.

Covers are typically used for boats to protect the interior of the boat from the environment, such as rain, snow, sun, leaves, dirt, and other debris, when not in use. Covers can be used for short periods of time to protect the boat between uses and/or for long periods of time, such the off-season when the boat is placed in storage or left outdoors. Traditional boat covers are often cumbersome and tedious to install, remove, and store. These boat covers typically include a canopy with snaps along the edge which are snapped to mating snaps on the boat. Trailers with a hard enclosure are an alternative solution for protecting a boat, but typically only provide access to the boat from the rear access door. Pontoon boats are particularly difficult to cover when they are on a trailer because the boat trailer frame is generally positioned below and medial to the pontoons and therefore doesn't provide good attachment points for the cover. There are typically 60 to 90 snaps that must be snapped together to attach the canopy to the boat. This task is performed at a raised elevation because of the trailer height, and the extra climbing can be dangerous.

Additionally, pontoon boats should not be pulled on a trailer for long distances or at highway speeds with the conventional mooring cover covering the boat. The disclosure herein allows the user to keep their boat covered at home or while on the trailer.

SUMMARY

According to various embodiments, a retractable trailer cover for mounting to an existing pontoon boat trailer is provided. The trailer cover defines laterally spaced and longitudinally extending sides and includes a plurality of substantially U-shaped, spaced ribs and a flexible cover material secured to the ribs. The ribs can extend from one side of the trailer cover to the other side and each rib can include two spaced vertical members connected by an elevated top member. The trailer cover also includes two elongated tracks and a plurality of wheels received within the tracks. One track extends along each of the longitudinally extending trailer cover sides. A lower end of each of the vertical members is connected to one of the wheels so that the ribs can slide or roll within the tracks. A plurality of mounting brackets can be spaced along each of the longitudinal sides, and the tracks can be affixed to the mounting brackets. Accordingly, the mounting brackets can be configured to mount the trailer cover to the boat trailer, and the ribs and flexible cover material can be selectively retracted or expanded along the tracks to retract or expand the trailer cover.

In another embodiment, a retractable trailer cover system adapted for retrofitting an existing pontoon boat trailer having a trailer frame with longitudinally extending side rails is provided. The system generally includes a canopy and a canopy frame, and the canopy can selectively cover at least a portion of the trailer frame. The canopy can include a plurality of U-shaped, spaced ribs that extend laterally over the trailer frame from one side rail to the opposite side rail. The canopy may also include a cover material that can be secured to the ribs to cover the ribs and boat trailer. The canopy frame can include multiple mounting brackets that may be spaced along each of the side rails. The canopy frame further includes two elongated tracks which can be affixed to the mounting brackets, where one track extends parallel and adjacent to each side rail of the trailer frame. Multiple wheels can be rotatably received within the tracks and each of the wheels can be affixed to one of the ribs so that the ribs can be slidably retained within the tracks. Accordingly, the mounting brackets can be configured to be affixed to the trailer frame to mount the retractable trailer cover system to the existing trailer frame, and the canopy can be configured to be retracted in an accordion-style manner to selectively uncover the boat trailer.

In another embodiment, a method of retrofitting a retractable trailer cover to an existing pontoon boat trailer which includes a trailer frame with longitudinally extending side rails is provided. The method includes the steps of: (a) mounting a plurality of mounting brackets to the trailer frame, (b) mounting an elongated track to the spaced mounting plates, (c) inserting a plurality of wheels within each guide channel of each track, (d) affixing a canopy frame to the plurality of wheels, and (e) securing a flexible cover material to the plurality of ribs.

In any of the embodiments herein, each mounting bracket can include a mounting plate and a shaft extending from the mounting plate and the tracks can be affixed to the mounting plates. The boat trailer includes a trailer frame with two or more crossbars and each shaft is received within an open end of the crossbars to attach the mounting brackets to the trailer frame.

In any of the embodiments herein, each of the mounting brackets can include a track mounting plate and a frame mounting plate and the tracks can be affixed to the track mounting plates. The boat trailer includes a trailer frame with longitudinally extending side rails, and the mounting brackets can be spaced along a length of the side rails. Each frame mounting plate can be affixed to one of the side rails to attach the mounting brackets—and retractable trailer cover—to the trailer frame.

In any of the embodiments herein, a cross member extends from one side to the other side of the trailer cover. One of the mounting brackets can be included on each end of the cross member and the trailer cover can include multiple cross members. Each of the mounting brackets includes a mounting plate and the tracks can be affixed to the mounting plates adjacent the ends of each cross member. The cross members can be affixed to the trailer frame to mount the retractable trailer cover to the boat trailer.

These and other objects, advantages, and features of the disclosure will be more fully understood and appreciated by reference to the description of the current embodiment and the drawings.

Before the embodiments of the disclosure are explained in detail, it is to be understood that the disclosure is not limited to the details of operation or to the details of construction and the arrangement of the components set forth in the following description or illustrated in the drawings. The disclosure may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the disclosure any additional steps or components that might be combined with or into the enumerated steps or components.

DESCRIPTION OF THE EMBODIMENT(S)

A retractable trailer cover 10, also referred to as a trailer cover system, that can be selectively expanded and retracted to cover and uncover an associated boat and boat trailer is provided. The trailer cover 10 is shown being used with bunk or float-on style pontoon boat trailers; however, other types of boats and associated boat trailers are also contemplated herein. This trailer cover can be adapted to fit and mount to new or used trailers. The described trailer cover makes it quick and easy to uncover and cover a pontoon boat while it is on the trailer. Additionally, the trailer cover can be utilized as a permanent storage unit for the boat for summer and winter storage.

The retractable trailer cover 10 is adapted to be mounted to an existing, conventional boat trailer 12 to cover a boat 14, an example of which is shown in FIGS. 1-2 and 4-5. The boat trailer 12 generally includes a metal trailer frame 20 with single or double axles, spaced, longitudinally extending side rails 22, and two or more transverse crossbars 24 extending between and connecting the side rails 22. The front end of the trailer 12 may be shaped in a "V". The exemplary boat trailer 12 includes two pairs of support bunks 26 for supporting the pontoons of the boat 14. The boat trailer 12 may also include a number of additional conventional features; for example, a roller and winch assembly and a hitch tongue assembly.

Figure 1:
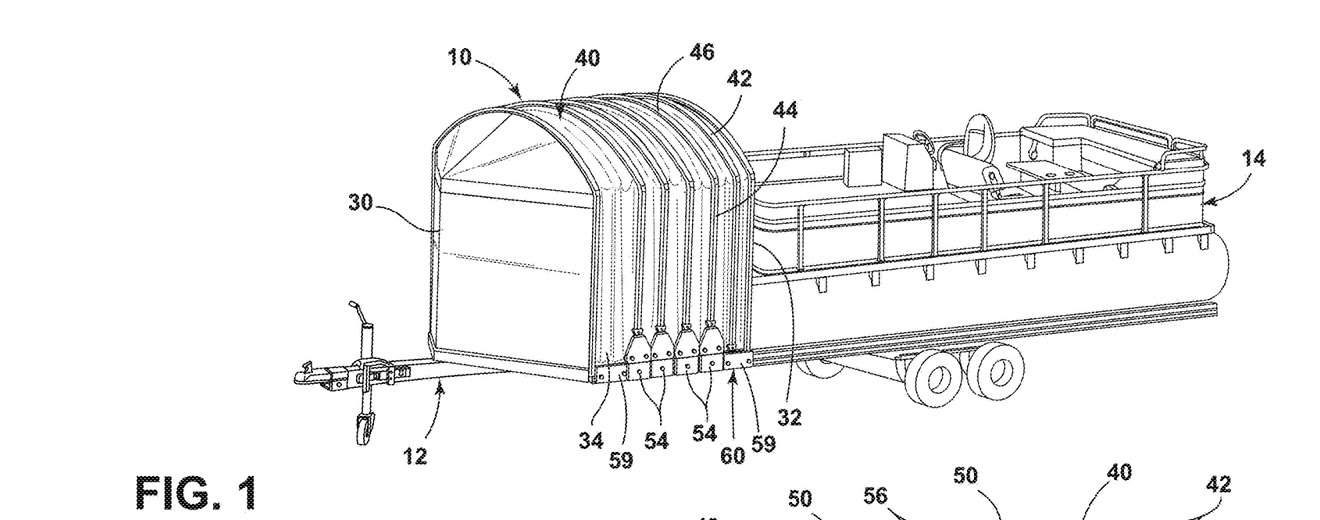
FIG. 1 is a side perspective view of a retractable trailer cover retrofitted to a boat trailer supporting a boat, illustrating a retracted position of a canopy of the retractable trailer cover, according to one embodiment.
Figure 2:
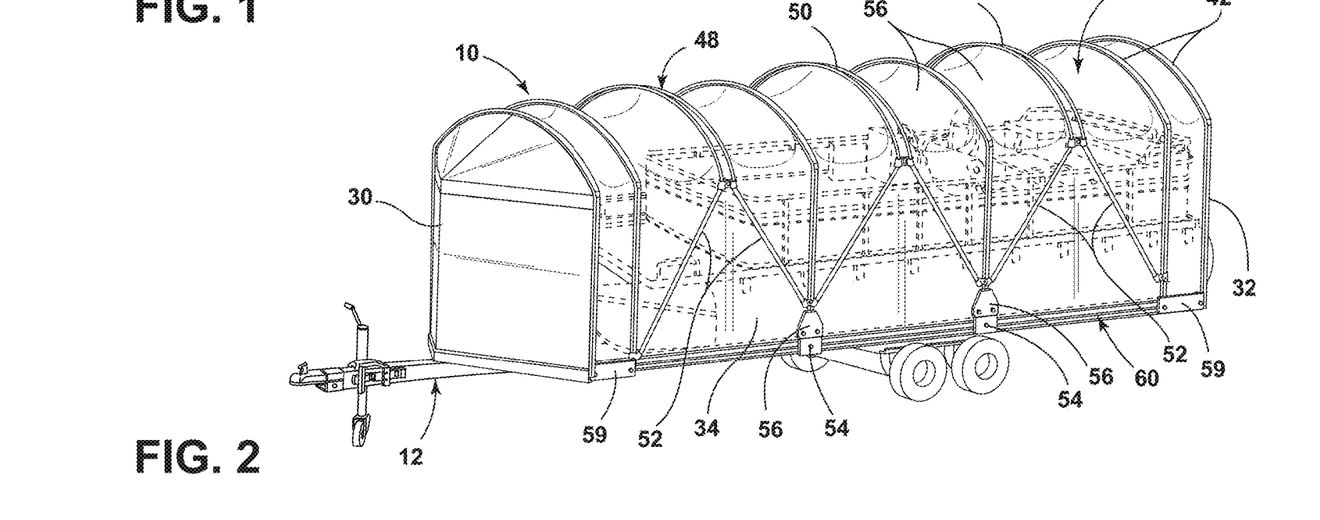
FIG. 2 is a side perspective view of the retractable trailer cover and boat trailer of FIG. 1, illustrating an expanded position of the canopy.

Referring to FIGS. 1-8, the trailer cover 10 defines a front end 30, a rear end 32, and first and second sides 34, 36. The trailer cover 10 includes a canopy 40 for selectively covering at least a portion of the trailer frame 20 and a canopy frame 60. The canopy 40 includes multiple U-shaped, spaced ribs 42. The ribs 42 are parallel to one another and extend laterally over and above the trailer frame 20, when installed thereto, from the first side 34 to the second side 36. Each rib 42 includes two spaced, substantially vertical members 44 connected by an elevated top member 46. The top member 46 can be arched, angled, or substantially horizontal. The canopy 40 may optionally include multiple cross brace ribs 48 positioned between adjacent ribs 42, as shown in FIG. 2. The cross brace ribs 48 include a top member 50 and two cross braces 52 arranged in a V-shape.

Referring to FIGS. 5-8, a lower end of each vertical member 44 can be fixedly attached to a gusset bracket 56. The vertical member 44 may be welded, bolted, or affixed by any other suitable means to the gusset bracket 56. Additionally, the gusset bracket 56 is substantially L-shaped and includes a vertical portion 56a and a horizontal portion 56b. A slide bracket 54 is disposed below the gusset bracket 56 and also includes a vertical portion 54a and a horizontal portion 54b. The horizontal portions 56b, 54b of the gusset bracket 56 and slide bracket 54 are juxtaposed and may be joined together by bolts or other suitable fasteners.

The canopy 40 further includes a cover 58, which can be secured to the ribs 42. The cover material 58 can be made from a canvas material or other suitable material, such as reinforced polyethylene and can include a single panel or multiple panels bonded together (e.g., sewn or adhered) to form an exterior covering for the canopy 40. The ribs 42 and cover material 58 define an enclosure for the boat trailer 12 that extends from the front end 30 to the rear end 32 when fully expanded. Additionally, the front end 30 of the canopy may be shaped in a "V" and may be enclosed, as shown in the figures. This front end 30 is stationary and includes a stationary rib 42 and lower framing. The front end 30 can include flexible canvas like the remainder of the canopy, or may be formed of a more rigid material. The rib 42 adjacent to the front end 30 can be attached to the front end 30 by a connecting bracket 59. The rear end 32 includes the last rib 42, which can be attached to and rigidly spaced at a desired distance from the adjacent sliding rib 42 by a rear connecting bracket 59, and therefore slide with the adjacent rib 42.

The canopy frame 60 includes multiple mounting brackets 62 and two elongated tracks 70. Each mounting bracket 62 can include a mounting plate 64 and a shaft 66 extending from the mounting plate 64. The shaft 66 may be welded to the mounting plate 64. The mounting brackets 62 are spaced along the first and second sides 34, 36 of the trailer cover 10 and each of the trailer frame side rails 22 when mounted to the trailer frame 20. Each track 70 is affixed to the mounting plates 64 of the series of spaced mounting brackets 62 on each of the first and second sides 34, 36 of the retractable trailer cover 10. Both the track 70 and mounting plate 64 can include through holes (not shown) into which a fastener can be installed. The track 70 can be bolted to the mounting plate 64, welded, or attached by any other suitable means.

Figure 6:
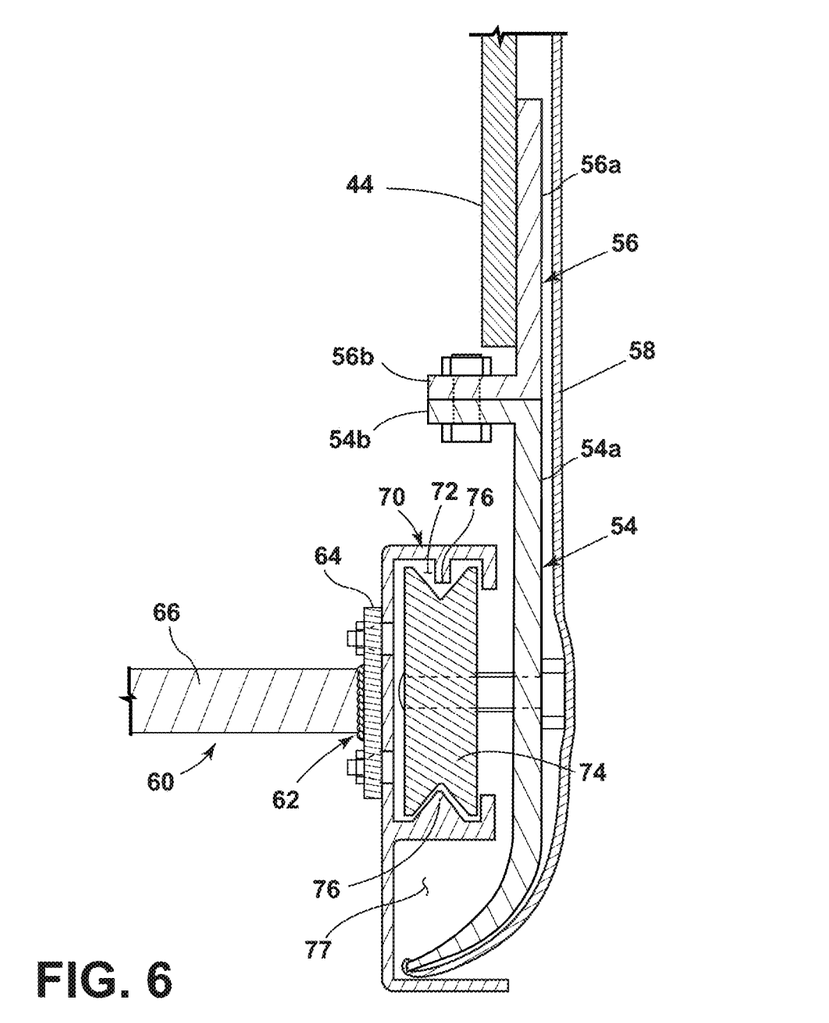
FIG. 6 is a detail, cross-sectional view of a lower portion of the canopy and the canopy frame.
Figure 7:
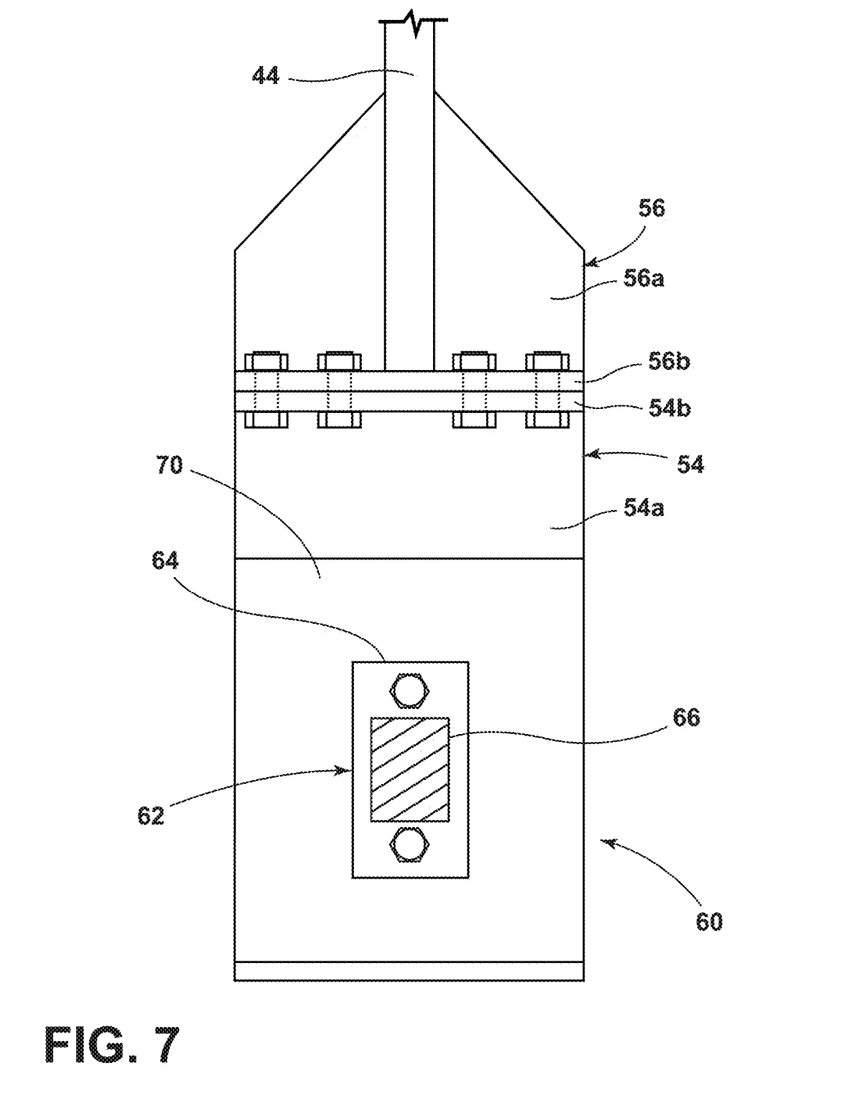
FIG. 7 is a side view of the lower portion of the canopy and canopy frame of FIG. 6.

Each track 70 includes an elongated canopy guide channel 72 within which multiple wheels 74 can be received and retained. The wheels 74 can rotate or slide within the guide channel 72 which can include vertically aligned upper and lower registration tracks 76 to engage and align the wheels 74 within the guide channels 72. Each slide bracket 54 is mounted to one of the wheels 74 so that the gusset brackets 56 and ribs 42 are slidably retained to the tracks 70. Further, the track 70 includes a lower channel 77 into which a lower extent of the slide bracket 54 can be tucked. As shown in FIG. 6, the lower extent of the slide bracket 54 includes a curve so that the lower extent is positioned within the lower channel 77, substantially tucking the slide bracket 54 and affixed cover material 58 into the track 70. In another embodiment, the wheels 74 may be a type of translation member, for example rollers, bearings, or slidable elements that are movable within or along the track 70.

Referring to FIGS. 5-8 and according to one embodiment, the shaft 66 of each mounting bracket 62 can be inserted into an open end of the trailer frame 20 crossbar 24. The shaft 66 and crossbar 24 are sized relative to one another and may be formed of box tube frame bars, or other suitable stock, and can be attached to one another by bolt, clevis pin, or other suitable fastener. Both the shaft 66 and crossbar 24 can include a through hole 78 into which the fastener can be installed, and may include a series of through holes 78 in one or both. Further, the shaft 66 can be inserted into the crossbar 24 at a selectable depth to fit a variety of sized boat trailers 12. It should be understood that the mounting brackets 62 are arranged in pairs on opposite ends of the crossbars 24 and in a series along the length of each track 70. The number of mounting brackets 62, crossbars 24, and ribs 42 can be increased or decreased from the quantity shown in the figures to meet the structural requirements and size of the trailer cover 10. As described, the canopy frame 60 and canopy 40 can accordingly be mounted to the trailer frame 20. Optionally, the mounting brackets 62 may be non-removably attached to the trailer frame 20 by using a more permanent means, such as welding, for affixing the shaft 66 to the crossbar 24.

As described above, the trailer cover 10 can be retrofitted to a boat trailer 12 by affixing the mounting brackets 62 to the trailer frame 20. In operation, the fully expanded trailer cover 10 can be slid to a retracted, or partially retracted position, by moving the ribs 42 laterally, from the rear end 32 toward the front end 30. The wheels 74 are free to rotate within the guide channel 72 of the tracks 70, thus moving the slide brackets 54 and connected ribs 42 along the length of the tracks 70 to retract and/or collapse the canopy 40 in an essentially accordion-style manner. The trailer cover 10 provides a quick and easy way to selectively uncover and cover a boat 14 while it is on the boat trailer 12.

Figure 9:
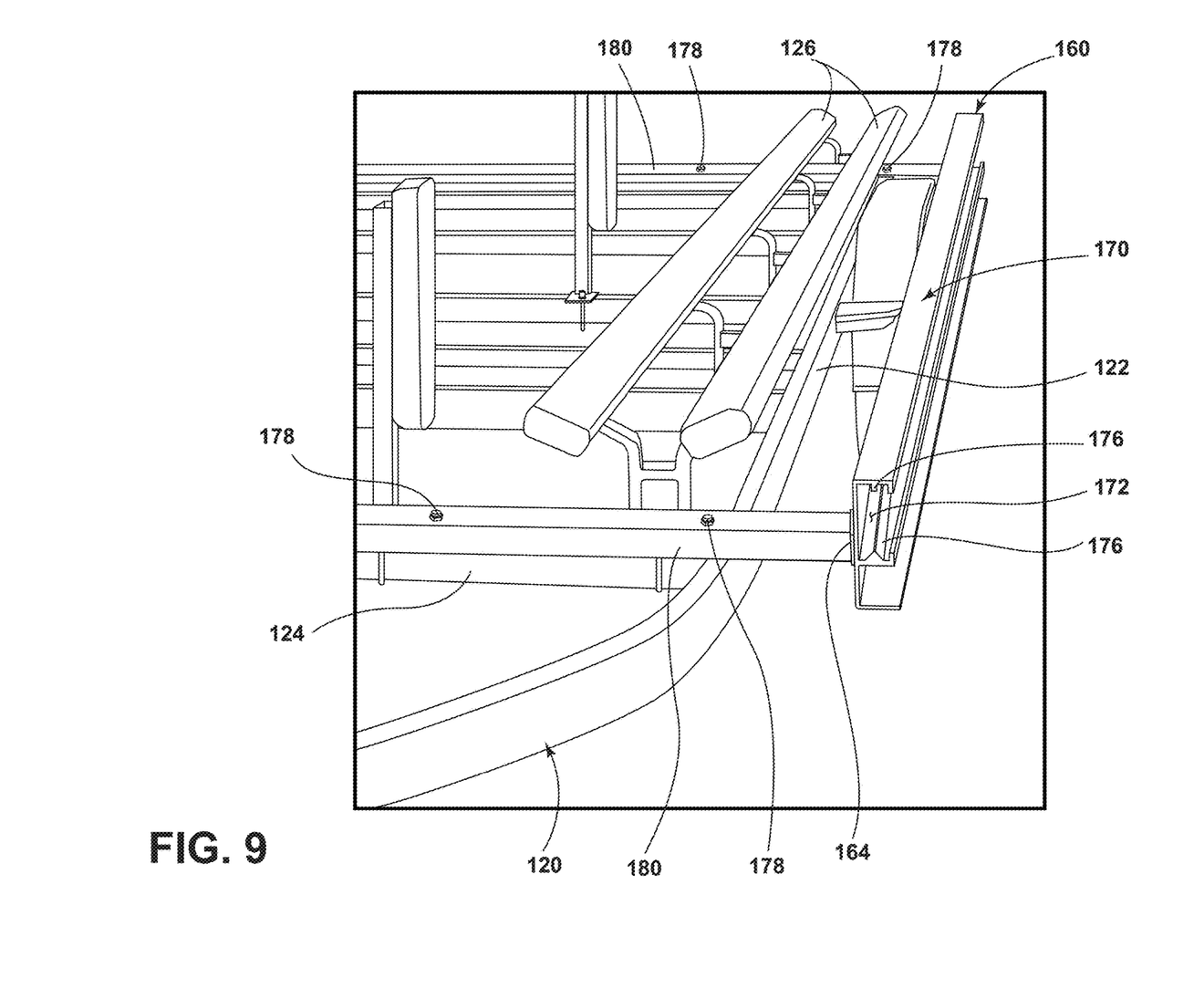
FIG. 9 is a partial view of an alternate canopy frame mounted to the boat trailer according to another embodiment.

An alternate arrangement is shown in FIG. 9, in accordance with another embodiment of the disclosure. For purposes of brevity, descriptions of similar elements are not repeated here, and like elements are identified with like numerals increased by 100. A cross member 180 extends from first to second side 134, 136 of the trailer cover 110 and a mounting bracket 162 is included on each end of the cross member 180. The cross member 180 takes the place of the shaft 66 described in previous embodiments. The end of the cross member 180 is attached to the mounting plate 164 of the mounting bracket 162. The trailer cover 110 includes multiple cross members 180, spaced from the front end 130 to the rear end 132. The cross members 180 can be mounted to the trailer frame 120 to mount the trailer cover 110 to the trailer frame 120. While the illustrated example shows the cross members 180 mounted above the side rails 122 of the trailer frame 120, mounting the cross members 180 either above or below the trailer side rails 122 is feasible. The cross members 180 can be attached to the trailer frame 120 by bolt, clevis pin, or other suitable fastener. Both the cross member 180 and trailer frame 120 can include aligned through holes 178 into which the fastener can be installed. Optionally, the cross members 180 may be non-removably attached to the trailer frame 120 by using a more permanent means, such as welding, for affixing the cross members 180 to the trailer frame 120.

Figure 10:
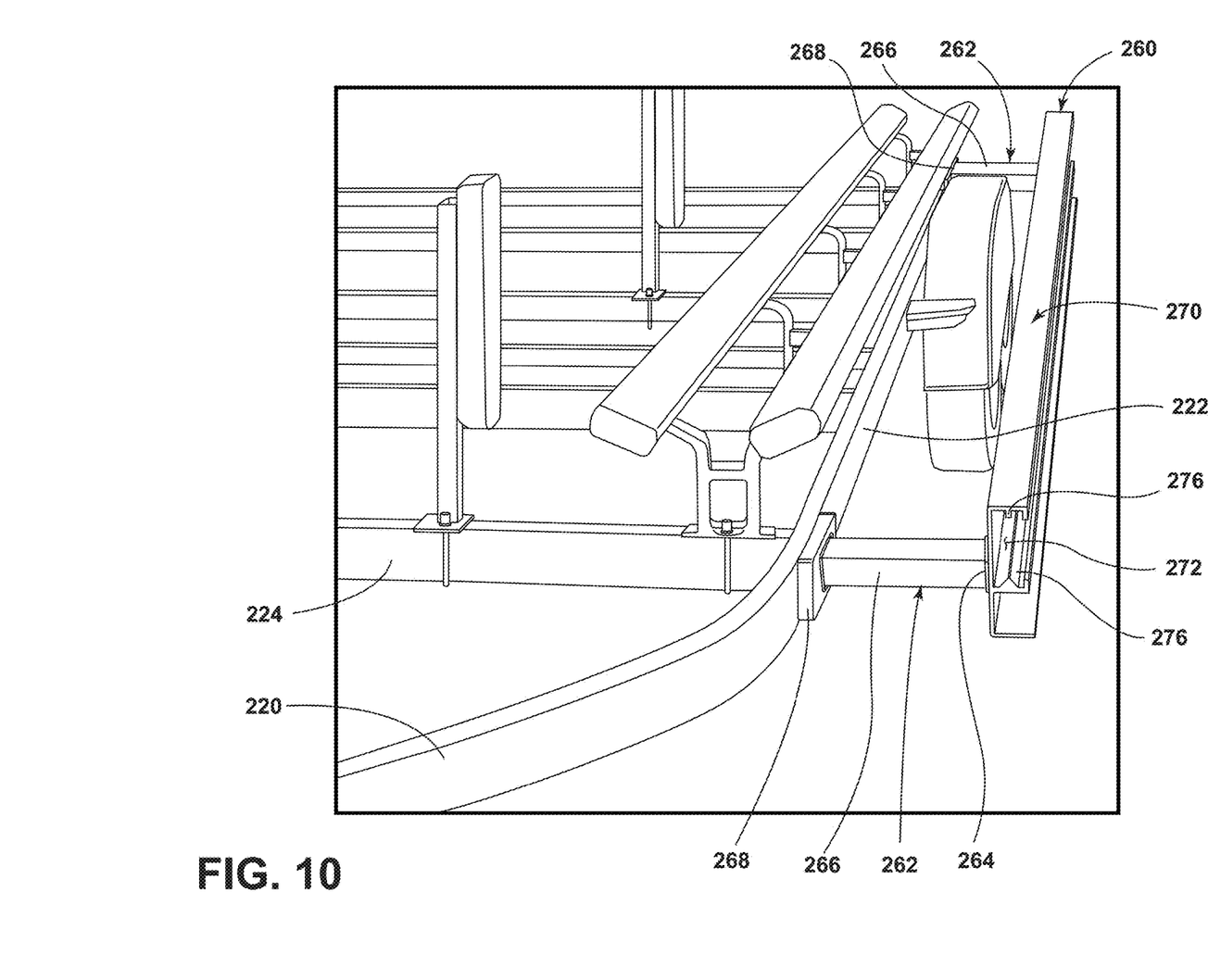
FIG. 10 is a partial view of another alternate canopy frame mounted to the boat trailer according to another embodiment.

Another alternate arrangement is shown in FIG. 10, in accordance with an embodiment of the disclosure. For purposes of brevity, descriptions of similar elements are not repeated here, and like elements are identified with like numerals increased by 200. Each mounting bracket 262 includes a track mounting plate 264 and a frame mounting plate 268 connected by a shaft 266 extending therebetween. The mounting brackets 262 are spaced along the length of the side rails 222 and the frame mounting plates 268 can be mounted to each of the trailer side rails 222 by bolts, welding, or other suitable mounting means. Further, the shaft 266 can be provided at a predetermined length so as to fit a variety of boat trailer 212 sizes. It should be understood that the mounting brackets 262 are arranged in spaced pairs across the trailer frame 220 and in a series along the length of each track 270. As described, the trailer cover 210 can accordingly be mounted to the trailer frame 220.

According to another embodiment of the disclosure, a method 300 of retrofitting a retractable trailer cover to an existing pontoon boat trailer is presented. The method includes: (a) mounting a plurality of mounting brackets to the trailer frame, (b) mounting an elongated track to the spaced mounting plates, (c) inserting a plurality of wheels into each guide channel of each track, (d) affixing a canopy frame to the plurality of wheels, and (e) securing a flexible cover material to the plurality of ribs.

Figure 8:
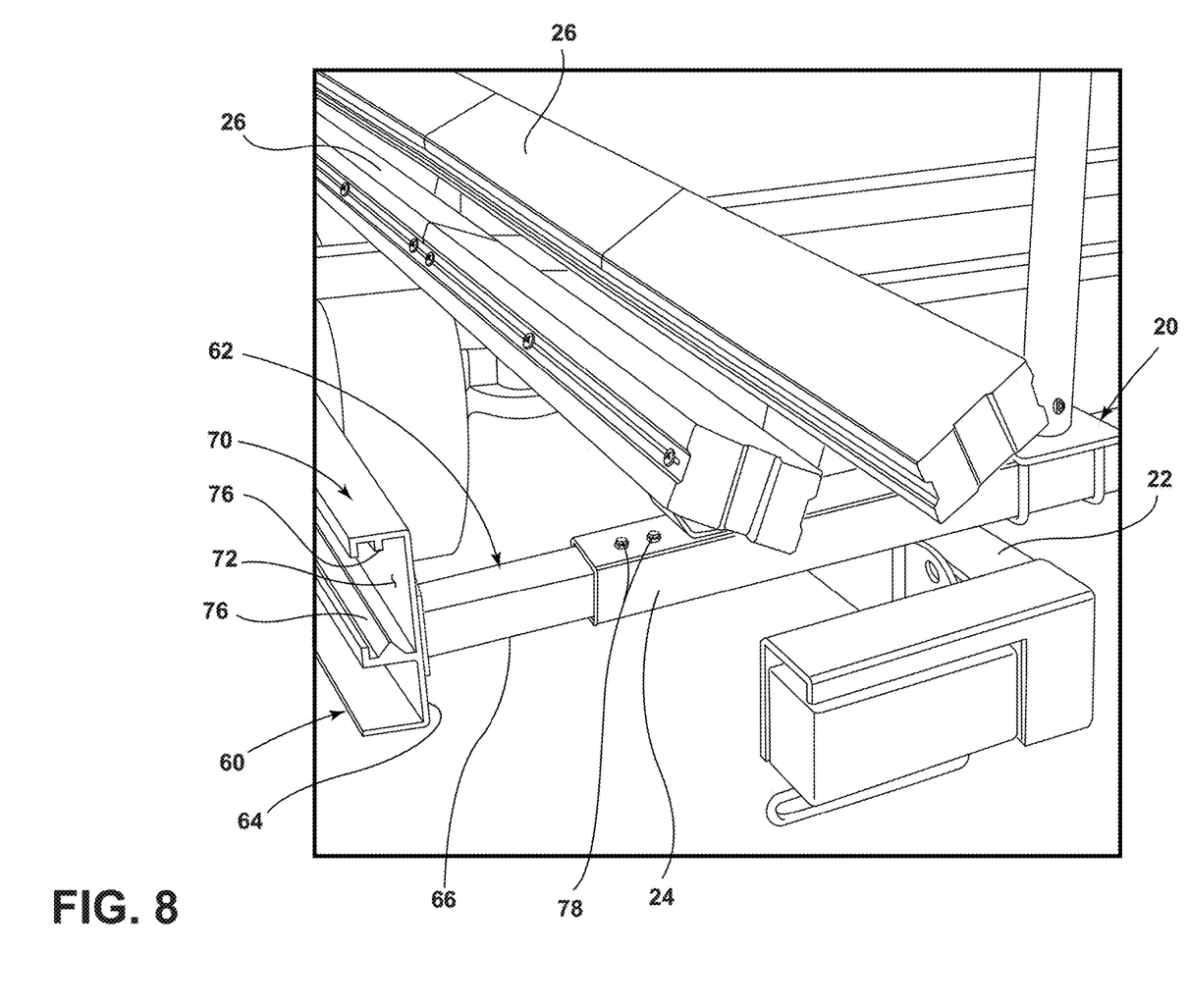
FIG. 8 is a partial view of the canopy frame mounted to the boat trailer.

As shown in FIG. 8, the mounting brackets 62 are mounted to the trailer frame 20 by inserting the shaft 66 of each mounting bracket 62 into the open end of the trailer frame 20 crossbar 24. This is repeated for each mounting bracket 62 and each crossbar 24, on each side of the trailer frame 20, with the mounting brackets 62 being spaced from one another along each of the side rails 22.

As shown in FIGS. 9-10, the tracks 70 are mounted to the mounting plates 64 by bolts, welding, or other attachment means. One track 70 extends along each of the side rails 22 and is mounted thereto by the multiple, spaced mounting brackets 62.

As shown in FIG. 6, each track 70 includes the guide channel 72 within which the wheels 74 can be received. The wheels 74 are inserted into the guide channel 72 and are free to rotate or slide within the guide channel 72, while upper and lower registration tracks 76 keep the wheels 74 aligned within the guide channels 72. The slide brackets 54 are mounted to each of the wheels 74 so that the ribs 42 can be slidably retained to the tracks 70.

Figure 3:
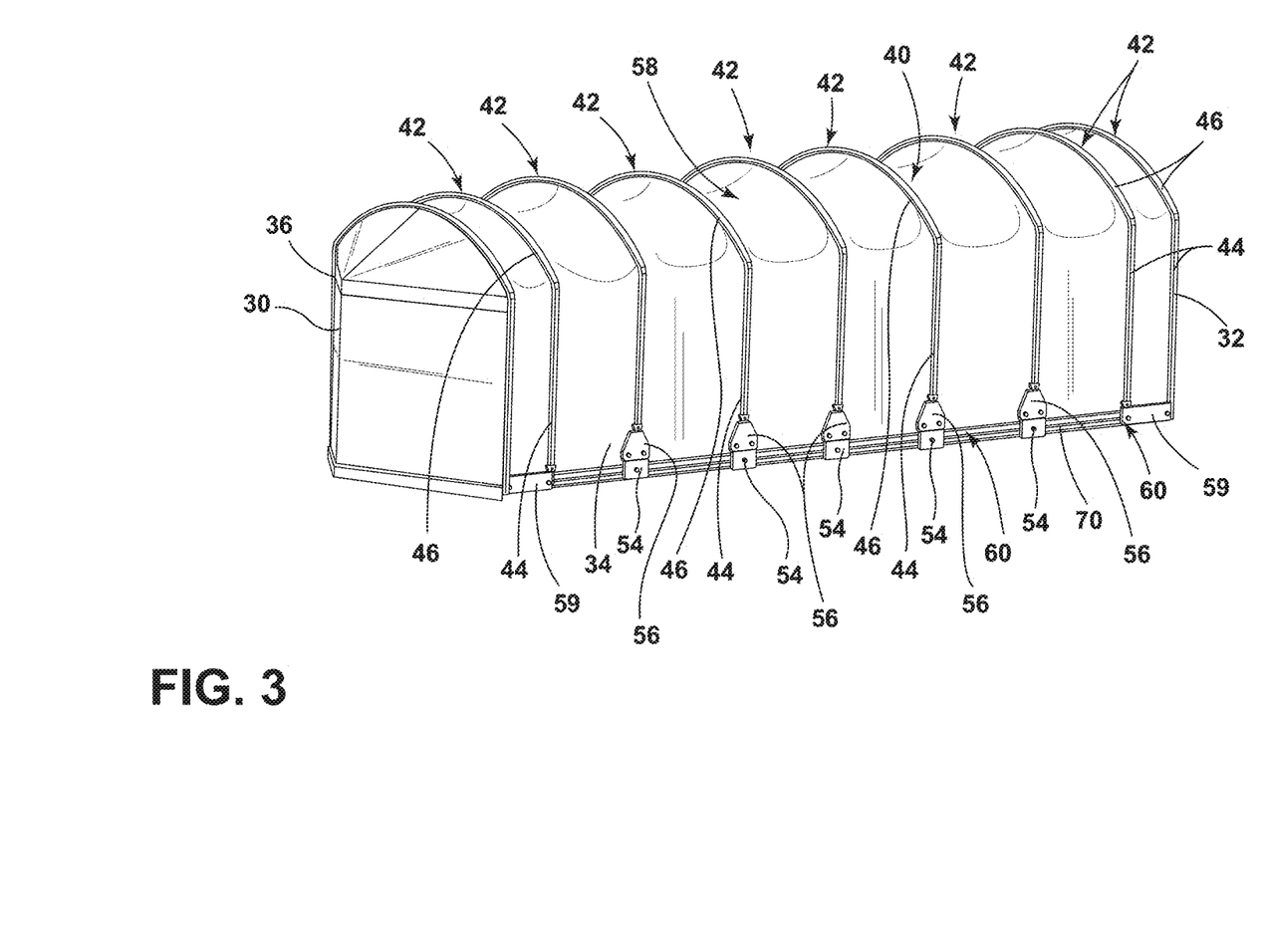
FIG. 3 is a side perspective view of the retractable trailer cover.
Figure 4:
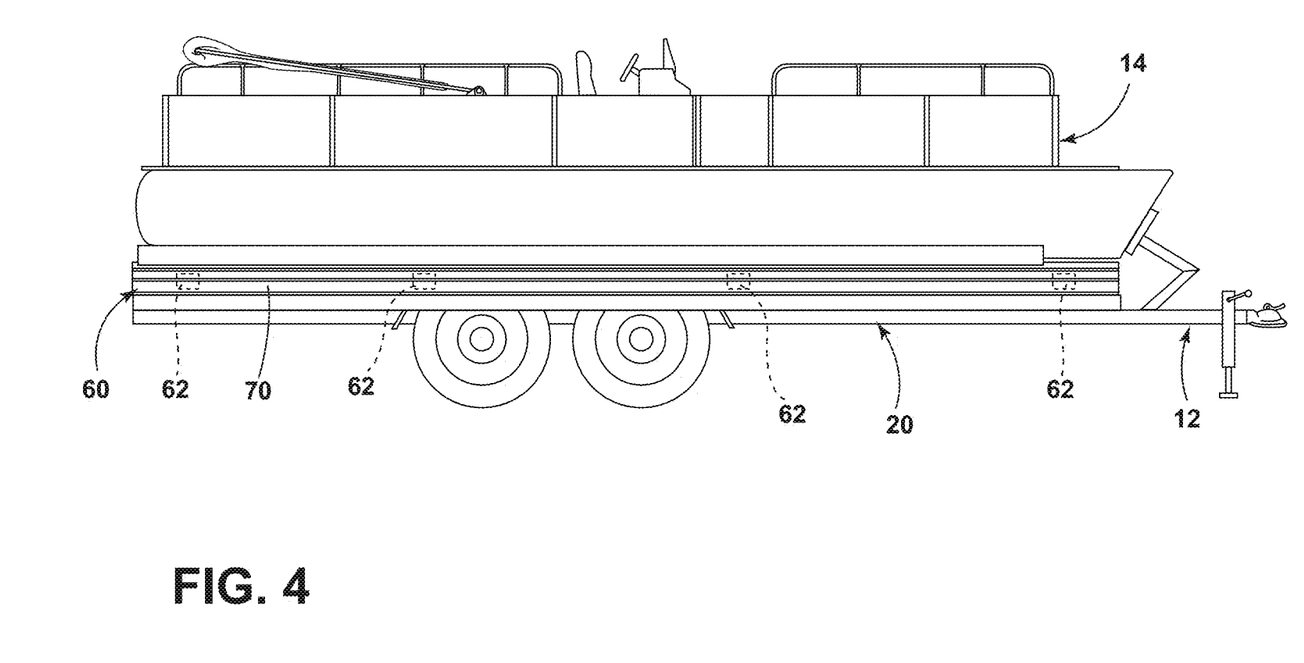
FIG. 4 is a side view of a canopy frame of the retractable trailer cover as mounted to the boat trailer.
Figure 5:
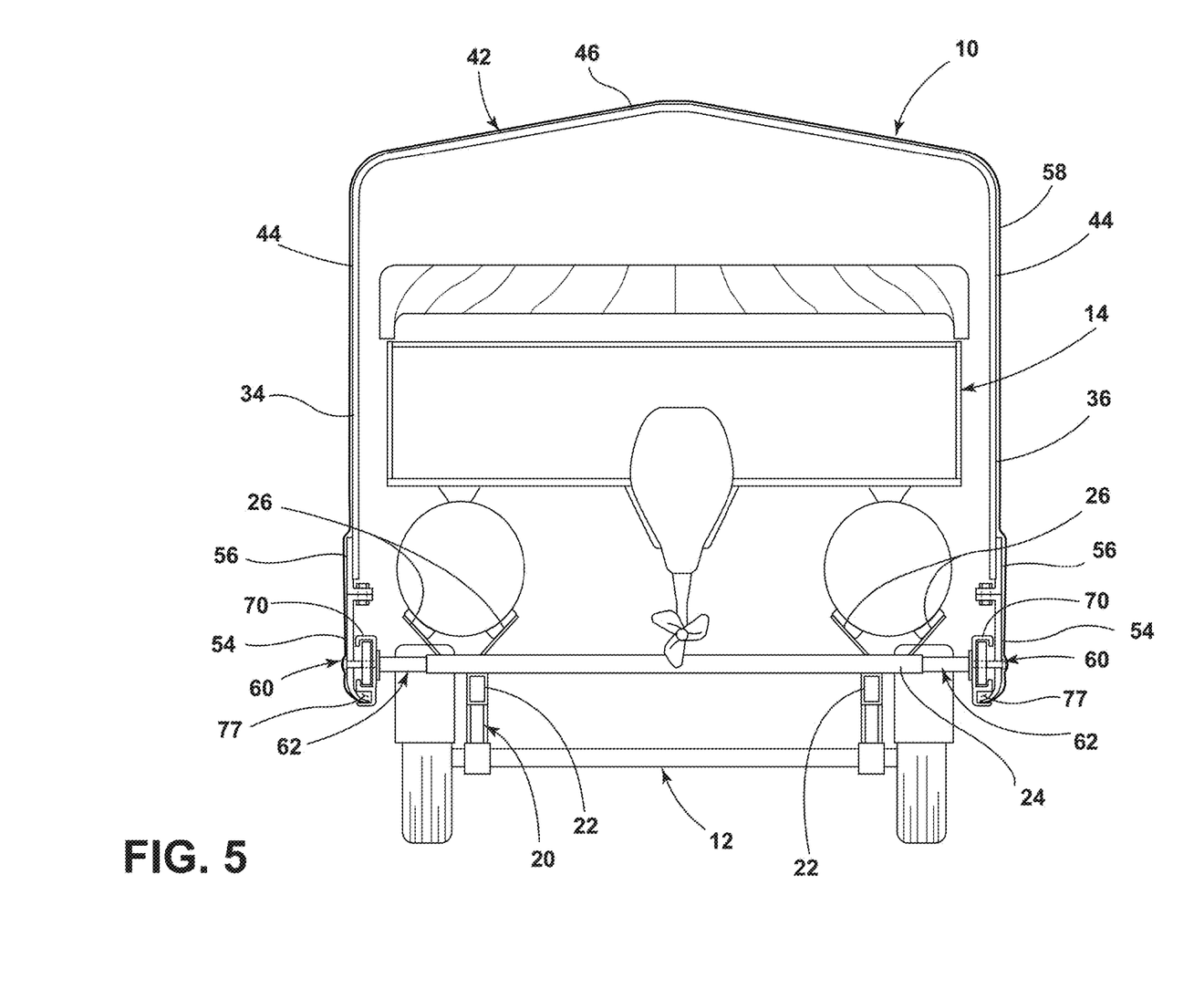
FIG. 5 is a rear view of the retractable trailer cover as mounted to the boat trailer.

As shown in FIGS. 1-3, the canopy frame 60 includes multiple spaced ribs 42 that extend laterally over the trailer frame 20 from one side rail 22 to the other side rail 22. The lower end of each rib 42 is affixed to the gusset bracket 56. The gusset bracket 56 is bolted, or otherwise fastened to, the slide bracket 54 by bolts or other fasteners installed through holes in the adjacent horizontal portions 54b, 56b of the brackets. Accordingly, the ribs 42 are slidably retained within the tracks 70.

Securing a flexible cover material to the plurality of ribs generally includes securing the cover material 58, shown in FIGS. 2-3, to either the interior or exterior side of the ribs 42. The ribs 42 and cover material 58 can selectively be retracted or expanded along the tracks 70 to retract or expand the trailer cover 10.

Another embodiment of the disclosure includes an alternate method step of mounting the plurality of mounting brackets to the trailer frame. As shown in FIG. 9, this step generally includes mounting the cross members 180 and attached mounting brackets 162 to the trailer frame 120 with bolts, clevis pins, or other suitable fasteners. The cross members 180 can be mounted to the trailer frame 120, either above or below the trailer side rails 122 to mount the trailer cover 110 to the trailer frame 120. Optionally, the cross members 180 may be non-removably attached to the trailer frame 120 by using a more permanent means, such as welding.

Still another embodiment includes an alternate method step of mounting the plurality of mounting brackets to the trailer frame. As shown in FIG. 10, this step generally includes affixing the frame mounting plates 268 to each of the trailer side rails 222 using bolts, welding, or other suitable mounting means to mount the mounting brackets 262 to the trailer frame 220. The mounting brackets 262 are arranged in spaced pairs across the trailer frame 220 and in a series along the length of each track 270.

As described herein, the retractable trailer cover 10 can be selectively expanded and retracted to cover and uncover an associated boat and boat trailer. The trailer cover 10 may be used for bunk style pontoon boat trailers; however, other types of boats and associated boat trailers are contemplated also. The retractable trailer cover 10 can be adapted to fit and mount to new or used trailers and makes it quick and easy to uncover and cover a boat while it is on the trailer.

The above description is that of current embodiments of the disclosure herein. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A retractable trailer cover system adapted for retrofitting an existing pontoon boat trailer having a trailer frame including longitudinally extending side rails, the system comprising:
   a canopy for selectively covering at least a portion of the trailer frame, the canopy including:
      a plurality of U-shaped, spaced ribs extending laterally over the trailer frame from one side rail to the opposite side rail; and
      a flexible cover material secured to and covering the plurality of ribs; and
   a canopy frame including:
      a plurality of mounting brackets spaced along each of the side rails;
      two elongated tracks affixed to the plurality of mounting brackets, one track extending parallel and adjacent to each side rail of the trailer frame; and
      a plurality of translation members received within the tracks, each of the plurality of translation members affixed to one of the plurality of ribs such that the plurality of ribs are movably retained within the tracks,
   wherein the plurality of mounting brackets are configured to be affixed to the trailer frame to mount the retractable trailer cover system to the trailer frame, wherein the canopy is configured to be retracted in an accordion-style manner to selectively uncover the boat trailer;
   wherein each bracket includes a shaft and a mounting plate, and the tracks are affixed to the mounting plates; and
   wherein each shaft is received within an open end of a crossbar of the trailer frame to mount the trailer cover system to the boat trailer.

2. The retractable trailer cover system of claim 1 including a plurality of cross braces connecting adjacent ribs.

3. The retractable trailer cover system of claim 1, wherein a cross member extends from side rail to side rail and one of the plurality of mounting brackets is included on each end of the cross member, the trailer cover system includes multiple cross members.

4. The retractable trailer cover system of claim 3, wherein each bracket includes a mounting plate, and the tracks are affixed to the mounting plates of the plurality of mounting brackets.

5. The retractable trailer cover system of claim 4, wherein the cross members are mounted to the trailer frame to mount the trailer cover system to the boat trailer.

6. A retractable trailer cover system adapted for retrofitting an existing pontoon boat trailer having a trailer frame including longitudinally extending side rails, the system comprising:
   a canopy for selectively covering at least a portion of the trailer frame, the canopy including:
      a plurality of U-shaped, spaced ribs extending laterally over the trailer frame from one side rail to the opposite side rail; and
      a flexible cover material secured to and covering the plurality of ribs; and
   a canopy frame including:
      a plurality of mounting brackets spaced along each of the side rails;
      two elongated tracks affixed to the plurality of mounting brackets, one track extending parallel and adjacent to each side rail of the trailer frame; and
      a plurality of translation members received within the tracks, each of the plurality of translation members affixed to one of the plurality of ribs such that the plurality of ribs are movably retained within the tracks,
   wherein the plurality of mounting brackets are configured to be affixed to the trailer frame to mount the retractable trailer cover system to the trailer frame, wherein the canopy is configured to be retracted in an accordion-style manner to selectively uncover the boat trailer;
   wherein each bracket includes a shaft extending between a track mounting plate and a frame mounting plate, and the tracks are affixed to the track mounting plates of the plurality of mounting brackets, wherein each frame mounting plate is affixed to one of the side rails of the trailer frame to mount the trailer cover system to the boat trailer.

\* \* \* \* \*